United States Patent [19]

Gabayson

[11] Patent Number: 5,045,575
[45] Date of Patent: Sep. 3, 1991

[54] METHOD OF REDUCING VOIDS IN THERMOSET RESIN PRODUCTS

[75] Inventor: Solomon M. Gabayson, San Diego, Calif.

[73] Assignee: General Dynamics Corporation, Convair Division, San Diego, Calif.

[21] Appl. No.: 451,693

[22] Filed: Dec. 18, 1989

[51] Int. Cl.⁵ .......................... C08K 5/00; C08K 5/52; C08L 67/00
[52] U.S. Cl. ...................... 523;458; 524/141; 524/127; 524/139; 524/711; 524/128; 523/515
[58] Field of Search ............... 524/141, 127, 139, 711, 524/128; 523/458, 515

[56] References Cited

U.S. PATENT DOCUMENTS

| | | | |
|---|---|---|---|
| 4,069,192 | 1/1978 | Monte et al. | 524/141 |
| 4,087,402 | 5/1978 | Monte et al. | 524/127 |
| 4,397,751 | 8/1983 | Dickstein et al. | 428/900 |

Primary Examiner—John Kight, III
Assistant Examiner—John Cooney
Attorney, Agent, or Firm—John R. Duncan; George T. Parsons

[57] ABSTRACT

A method of improving the flowability and reducing voids in liquid synthetic thermosetting resins precursor compositions used to pot structures such as a honeycomb core or electronic parts and assemblies. Up to about 0.50 weight percent of a suitable titanate coupling agent is mixed with the liquid resin precursor, preferably in a vacuum or an inert atmosphere, any necessary hardener is added later to the premixed resin with the agent, then the resin is poured into a mold holding the structure to be potted. The titanate coupling agents have the general formula:

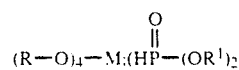

where:
R is an alkoxy, alkyl, alkenyl, alkynyl or aralkyl group having from 1 to about 30 carbon atoms or a substituted derivative thereof;
M is zirconium or titanium; and
R is independently an aryl, aralkyl, alkaryl, alkyl or alkeno group having from 1 to about 30 carbon atoms.

13 Claims, No Drawings

METHOD OF REDUCING VOIDS IN THERMOSET RESIN PRODUCTS

BACKGROUND OF THE INVENTION

This invention relates in general to methods of potting structures in thermosetting resin compositions and, more specifically to potting structures using such resins including a quantity of a titanate coupling agent to reduce voids.

Titanate coupling agents are well known and ar used for a wide variety of purposes. Primarily, these coupling agents are used to improve the surface bond between an inorganic filler material and an organic polymer matrix by acting as a molecular bridge at the interface between the two materials. The coupling agents, when incorporated into filled polymer systems, have in the past been used to improve dispersion and rheology, improve impact strength and mechanical properties, promote adhesion, and inhibit corrosion.

Among the early patents disclosing and claiming titanate coupling agents for use with fillers in the preparation of thermosetting resins are U.S. Pat. Nos. 4,069,192, 4,080,353, and 4,087,402. A number of patents, assigned to Kenrich Petrochemicals, Inc., were issued in the name of Salvatore J. Monte and Gerald Sugarman between 1978 and 1987, covering a variety of titanate coupling agents and resin systems. Other patents utilizing titanate additives for resin compositions to improve coupling or bonding include U.S. Pat. No. 4,163,004 for dental filling compounds; U. S. Patent 4,269,756 for glass fiber reinforced resins; U.S. Pat. No. 4,308,298 for marble dust filled resins; U.S. Pat. No. 4,363,887 for titanium dioxide filled coatings; and U.S. Pat. No. 4,397,751 for ferric oxide filled recording materials.

Other patents have disclosed the use of titanate coupling agents in unfilled resin systems for other purposes, such as U.S. Pat. No. 4,424,294 to improve flow properties in an unfilled copolyimideamide, German Patent 2,758,112 as a catalyst in a polyol system, and Japanese Patent 16,9054 to improve coating adhesion.

The prior art, however, does not suggest usefulness of such titanate coupling agents for reducing or eliminating voids in filled or unfilled resins used for potting structures such as honeycomb core and electronic components or assemblies.

Honeycomb core panels in which a hexagonal pattern (or "honeycomb") foil core is bonded between face sheets have come into widespread use, particularly in aerospace applications due to their excellent strength-to-weight ratio. Typically, aluminum or titanium honeycomb core is brazed or diffusion bonded to aluminum or titanium face sheets.

While the overall panels have considerable strength and stiffness, local areas may fail if subjected to impact or other localized high stress. For example, it is difficult to fasten other structures to such a panel without causing localized deformation or crushing of the panel. To avoid this problem, the local areas are generally potted or filled with a resin precursor which is cured in place to reinforce the potted areas and provide a higher strength attachment point. In order to save weight, which is of critical importance in many aerospace applications, only a minimum area is potted. The potted region, therefore, must have uniform high strength. Avoidance of voids or bubbles in the potted area which can severely reduce strength is of great importance.

Large and complex panels must be rejected for use if excessive voids are found in potted areas. Rework of these areas is very difficult or sometimes impossible so that excessive voids can result in scrapping expensive panels. Similarly, where electronic components or assemblies are to be potted in resin. excessive voids may allow entry of moisture or may unacceptably weaken the assembly where it is to be used in a hazardous environment.

Many existing thermosetting resins, such as epoxies, have excellent strength properties and bond well to the honeycomb core material or electronic components. Despite careful processing, mixing and pouring, often excessive voids form which are not detectable until after a panel or potted electronic assembly is complete and tested, such as by ultrasonic examination.

Therefore, there is a continuing need for methods of preparing potting compositions and of performing the potting operation which will substantially eliminate voids in the potted product.

SUMMARY OF THE INVENTION:

The above-noted problems (and others) are overcome by the method of this invention which basically comprises mixing with a resin precursor from about 0.1 to 0.5 weight percent of a titanate or zirconate coupling agent having the following general formula:

then curing the resin. Significant improvements in resin precursor flowability and greatly reduced voids in cured resins are found to result from the added titanate or zirconate coupling agents.

Of the above coupling agents, best results have been obtained with the following coupling agents: tetra (2,2 diallyoxymethyl) butyl, di (ditridecyl) phosphito titanate, available under the KR-55 designation from Kenrich Petrochemicals, Inc., having the formula:

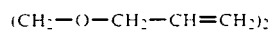

tetra (2,2, diallyoxymethyl) butyl, di (ditridecyl) phosphito zirconate available from Kenrich under KZ-55 designation and having the formula:

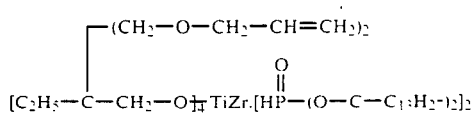

tetraisopropyl di (dioctyl) phosphito titanate, available from Kenrich under the KR-41B designation and having the formula:

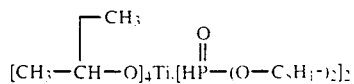

tetraoctyl di (ditridecyl) phosphite titanate, available from Kenrich under the KR-46B designation, and having the formula:

and mixture thereof.

Of these, optimum results are obtained with KZ 55, where, in the above general formula M=Zr, $$R = (C_2H_5)(CH_2=CHCCH_2O)_2CCH_2; \text{ and}$$

$$R^1 = C_{13}H_{27}$$

Any suitable thermosetting resin may be used with these coupling agents. Typical resins include epoxies, polyesters, polyurethanes, phenolics, polyvinyl esters, polyacrylics, silicone, and mixtures or copolymers thereof. Of these, best results are obtained with epoxies because they are widely used as a standard core potting material.

Care should be used in mixing to avoid entrapment of air in the mixture of resin, hardener and coupling agent. Any suitable mixing method and equipment may be used which will uniformly blend the components without significant air entrapment.

For optimum results, I prefer to maintain an inert atmosphere, such as argon, over the ingredients during mixing. I have found that this reduces discoloration of the resin and aids in minimizing voids in the cured resin.

DETAILED DESCRIPTION OF PREFERRED EMBODIMENTS

Details of the invention and of certain preferred embodiments will be further understood upon reference to the following examples. All parts and percentages are by weight unless otherwise indicated:

EXAMPLE I

About 100 parts by weight Epocast 1651, a filled two-component syntactic epoxy resin precursor from the Furane Products Company, is placed in a container. About 12 parts by weight of an Epocast hardener from Furane Products Company is carefully mixed into the resin in a manner designed to minimize mechanical entrapment of air in the mixture. An air atmosphere is maintained over the mixture The mixture is poured into the core and allowed to cure for about eight (8) hours (4 hours at ambient conditions, approximately 2 hours at about 200° F., and approximately 2 hours at about 350° F.). The material is relatively thick and does not pour well. Upon completion of cure, a solid block results. The block is sawed through along the approximate vertical centerline. A great many internal voids are found together with darkening from the normal cream color of the resin.

EXAMPLE II

The experiment of Example I is repeated, except that 0.3 parts by weight KR-55 titanate coupling agent from Kenrich Petrochemicals, Inc. is mixed into the resin precursor with the hardener. Flowability and rheology of the mixture is found to be much improved as the mixture is poured from the mixing container into the mold. After curing is complete, the block is sawed approximately along the vertical centerline. While the product is still visibly discolored, only a very few small voids are observed. The discoloration appears to be due to degradation and has a slight adverse effect on physical properties.

EXAMPLE III

The experiment of Example II is repeated except that all mixing is done under an argon gas atmosphere. The product in this case is found to be uniformly cream in color with no areas of discoloration. Flowability and absence of voids are excellent, substantially the same as in Example II.

EXAMPLE IV

A series of parallel tests are conducted, using the same resin composition and conditions, using different accelerator and coupling agent.

About 73 parts by weight of a polyglycidyl ether of phenol-formaldahyde novolac available under the trademark DEN 431 and about 27 parts by weight of a polyglycidyl ether of phenol-formaldehyde novolac available under the trademark DEN 438 which are epoxy resin precursors from Dow Chemical are mixed with about 88 parts by weight of methyltetrahydrophthalic anhydride, generally known as MTHPA anhydride hardener and about 0.5 parts by weight of a coupling agent as indicated in the following table at about 200 degrees F. About 0.8 parts by weight of the accelerator as indicated in the following table and about 0.5 parts by weight of a ditertiary butyl peroxy cyclohexane co-curative, available under Lucidol designation are added to the mixture and thoroughly mixed. BDMA refers to benzyldimethylamine. The mixture is then applied onto a glass fiber mat, placed in a vacuum oven, and heated, at 15 psig, for one hour at about 200 degrees F., one hour at about 300 degrees F., and one hour at about 350 degrees F. The resulting second samples are equilibrated at about 40% relative humidity and about 75 degrees F. for about 48 hours. The samples are subjected to X-ray analysis to determine the void percentages. Results for various combinations of accelerator and coupling agent are as follows:

| EXAMPLE | COUPLING AGENT | ACCELERATOR | % VOID VOLUME |
|---------|---------------|-------------|---------------|
| IV(A)   | NONE          | BDMA        | 0.8           |
| IV(B)   | KZ-55         | BDMA        | 0.5           |
| IV(C)   | KR-55         | BDMA        | 0.2           |
| IV(F)   | KR-41B        | BDMA        | 0.6           |

As these results show, the addition of the coupling agent significantly reduces void content.

EXAMPLE V

A series of parallel tests are conducted, using the same resin formulation and reaction conditions, but using different cure catalysts and coupling agents.

A graphite fabric reinforced polyisocyanate resin is prepared as follows:

About 100 parts by weight X U 71782 cyanate resin precursor from Dow Chemical is mixed with about 0.4 parts by weight of a cure catalyst and a coupling agent as shown in the following table. The mixture is applied, at about 250 degrees F., to a 24"×24" sheet of 12 ply Celion-3000 graphite fiber fabric. The resin is cured for about 3 hours at about 300 degrees F., followed by about 3 hours at about 400 degrees F., and about 3 hours at about 500 degrees F. in a vacuum oven. The second run is equilibrated at about 40% relative humidity for about 48 hours at about 75 degrees F. Void content is then measured by X-ray analysis. The results are shown in the following table:

| EXAMPLE | COUPLING AGENT | ACCELERATOR | % VOID VOLUME |
|---------|---------------|-------------|---------------|
| V(A) | NONE | Triethylene diamine | 0.9 |
| V(B) | NZ-09 | Triethylene diamine | 0.4 |
| V(C) | NONE | LICA44b | 0.5 |
| V(D) | NZ-09 | LICA44b | 0.4 |
| V(E) | NZ-97 | LICA44B | 0.1 |
| V(F) | NONE | NZ-44B | 0.4 |
| V(G) | NZ-97 | NZ-44B | 0.1 |

As shown, addition of the coupling agent significantly reduces void content.

While certain specific resins, coupling agents and other ingredients and conditions have been specified in the above description of preferred embodiments, these can be varied or other ingredients added, where suitable, with similar results. For example, fillers, colorants or the like may be added to the mixture, if desired.

Other applications, modifications and ramifications of this invention will occur to those skilled in the art upon reading this disclosure. Those are intended to be included within the scope of this invention as defined in the appended claims.

I claim:

1. The method of preparing a resin mixture suitable for potting structures which when used is substantially free from voids and discoloration which comprise the steps of: providing a quantity of a liquid synthetic resin precursor; mixing therewith from about 0.1 to 0.5 weight percent, based on resin precursor weight of a titanate or zirconate coupling agent having the general formula:

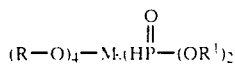

where: R is an alkoxy, alkyl, alkenyl, alkynyl or aralkyl L group having from 1 to about 30 carbon atoms or a substituted derivative thereof;

M is zirconium or titanium; and

R¹ is independently an aryl, aralkyl, alkaryl, alkyl or alkeno group having from 1 to about 30 carbon atoms.

2. The method according to claim 1 further including maintaining vacuum or an inert gas atmosphere over said resin precursor during said mixing.

3. The method according to claim 1 wherein said coupling agent is selected from the group consisting of tetra (2,2 diallyloxymethyl butyl di (ditridecyl) phosphito titanate, tetra (2,2 diallyloxymethyl) butyl di (ditridecyl) phosphito zirconate, tetraisopropyl di (dioctyl) phosphito titanate, tetraoctyl di (ditridecyl) phosphito titanate, and mixtures thereof.

4. The method according to claim 1 wherein said coupling agent is tetra (2,2 diallyloxymethyl) butyl di (ditridecyl) phosphito titanate.

5. The method according to claim 1 wherein said resin is an epoxy resin.

6. A resin mixture suitable for potting structures which comprises:

a quantity of a liquid synthetic resin precursor; mixed therewith from about 0.1 to 0.5 weight percent, based on resin precursor weight, of a titanate or zirconate coupling agent having the general formula:

where:

R is an alkoxy, alkyl, alkenyl, alkynyl or aralkyl group having from 1 to about 30 carbon atoms or a substituted derivative thereof;

M is zirconium or titanium; and

R¹ is independently an aryl, aralkyl, alkaryl, alkyl or alkeno group having from 1 to about 30 carbon atoms.

7. The mixture according to claim 6 wherein said coupling agent is selected from the group consisting of tetra (2,2 diallyloxymethyl butyl di (ditridecyl) phosphito titanate, tetra (2,2 diallyloxymethyl) butyl di (ditridecyl) phosphito zirconate, tetraisopropyl di (dioctyl) phosphito titanate, tetraoctyl di (ditridecyl) phosphito titanate, and mixtures thereof.

8. The mixture according to claim 6 wherein said coupling agent is tetra (2,2 diallyloxymethyl) butyl di (ditridecyl) phosphito titanate.

9. The mixture according to claim 6 wherein said resin is an epoxy resin.

10. The method of potting a structure in a resin which is substantially free from voids and discoloration, which comprises the steps of:

providing a quantity of a liquid synthetic resin precursor; mixing therewith from about 0.1 to 0.5 weight percent, based on resin precursor weight, of a titanate or zirconate coupling agent having the general formula:

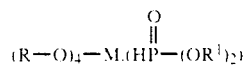

where:

R is an alkoxy, alkyl, alkenyl, alkynyl or aralkyl group having from 1 to about 30 carbon atoms or a substituted derivative thereof;

M is zirconium or titanium;

R¹ is independently an aryl, aralkyl, alkaryl, alkyl or alkeno group having from 1 to about 30 carbon atoms;

surrounding a structure to be potted with said resin precursor or mixture; and curing said resin.

11. The method according to claim 10 further including maintaining vacuum or an inert gas atmosphere over said resin precursor during said mixing and surrounding steps.

12. The method according to claim 10 wherein said coupling agent is selected from the group consisting of tetra (2,2 diallyloxymethyl butyl di (ditridecyl) phosphito titanate, tetra (2,2 diallyloxymethyl) butyl di (ditridecyl) phosphito zirconate, tetraisopropyl di (dioctyl) phosphito titanate, tetraoctyl di (ditridecyl) phosphito titanate, and mixtures thereof.

13. The method according to claim 10 wherein said coupling agent is tetra 2,2 diallyloxymethyl) butyl di (ditridecyl) phosphito titanate.

* * * * *